United States Patent [19]

Rabinovich et al.

[11] Patent Number: 5,047,474

[45] Date of Patent: Sep. 10, 1991

[54] POLYMERIC MODIFIER COMPOSITIONS

[75] Inventors: Ismail S. Rabinovich, Holland; Eugene C. Szamborski, Richboro, both of Pa.

[73] Assignee: Rohm and Haas Company, Philadelphia, Pa.

[21] Appl. No.: 389,011

[22] Filed: Aug. 3, 1989

[51] Int. Cl.$^5$ .................. C08G 63/48; C08G 63/91; C08L 51/04; C08L 53/00
[52] U.S. Cl. ..................................... 525/71; 525/902
[58] Field of Search ............................. 525/902, 71

[56] References Cited

U.S. PATENT DOCUMENTS

| 3,985,703 | 10/1976 | Ferry | 525/902 |
| 4,120,833 | 10/1978 | Purvis et al. | 525/71 |
| 4,362,845 | 12/1982 | Kamata et al. | 525/902 |
| 4,393,172 | 7/1983 | Lindner et al. | 525/71 |
| 4,443,585 | 4/1984 | Goldman | 525/902 |

FOREIGN PATENT DOCUMENTS 0269324 6/1988 European Pat. Off. ............ 525/902
0279724 8/1988 European Pat. Off. ............ 525/902

OTHER PUBLICATIONS

E. H. Crook; Research Disclosure #29246; Alteration of Appearance of Impact-Modified Polycarbonate with Blends of Impact Modifiers; Aug. 1988.
R. H. Weese, S. M. Liwak, E. H. Crook; Res. Disclosure #29459; Elimination of Pearlescence in Impact-Modified Polyglutarimides; Oct., 1988.

Primary Examiner—John C. Bleutge
Assistant Examiner—W. R. H. Clark
Attorney, Agent, or Firm—Darryl P. Frickey; Terence P. Strobaugh

[57] ABSTRACT

Modifier compositions of acrylic core/shell polymers and alkyl methacrylate-butadiene-styrene core/shell polymers are added to polyvinyl halides to provide materials with improved color depth and impact strength, as well as reduced pearlescence.

19 Claims, No Drawings

POLYMERIC MODIFIER COMPOSITIONS

FIELD OF THE INVENTION

The invention relates to modifier compositions for use in polymers. More specifically, the invention relates to impact modifier compositions for polyvinyl chloride.

BACKGROUND OF THE INVENTION

Modifiers are polymeric compositions which are included in a matrix polymer to improve properties such as impact strength. Modifiers have been used to impart toughness and ductility to polyvinyl chloride ("PVC") for extrusion and injection molding applications.

Various types of modifiers for PVC are known in the art. For example, core/shell polymers of methyl methacrylate, butadiene, and styrene ("MBS") have been employed as modifiers to improve the toughness of PVS. MBS polymers, however, do not impart either sufficient weatherability or ultraviolet light resistance to be used in PVC for outdoor applications.

Acrylic core/shell modifers such as those with poly (butyl acrylate) cores, and poly (methyl methacrylate) shells have been employed to impart ultraviolet light resistance to PVC. These acrylic core/shell polymer modifiers, however, generally provide less impact strength than MBS modifiers. Furthermore, acrylic core/shell polymer modifiers impart non-uniform light absorption, known as pearlescence, as well as loss of color depth in pigmented PVC compositions.

A need therefore exists for modifers which have weatherability and ultraviolet light resistance which impart improved ductility and toughness to PVC compositions while avoiding disadvantages such as pearlescence and loss of color depth.

SUMMARY OF THE INVENTION

In accordance with the invention, polymeric modifiers comprising a mixture of acrylic core/shell polymer and MBS core/shell polymer are added to polyvinyl halides. The acrylic core/shell polymer includes a core of $C_2$-$C_8$ acrylates and a shell of homopolymers or copolymers of alkyl acrylates and alkyl methacrylates. The MBS core/shell polymers have a core of a polymer containing butadiene, a first outer stage of either styrenic polymers, styrene/methacrylate polymers, and alkyl methacrylate polymers, and a second outer stage of either styrenic polymers, styrene/methacrylate polymers, and alkyl methacrylate polymers where compositions of the first and second outer stages are not identical. The modifiers can be employed in polyvinyl halides such as polyvinyl chloride to provide products which show improved color depth, impact strength, and decreased pearlescence. The modifiers may be employed in any amount sufficient to impart improved properties to the polyvinyl halide compositions.

DETAILED DESCRIPTION OF THE INVENTION

Having briefly summarized the invention, the invention will now be described in detail by reference to the following specification and non-limiting examples.

In accordance with the invention, modifiers which have a wide range of percentages of acrylic core/shell polymer and MBS components may be employed to impart improved coloor depth, impact strength, and decreased pearlescence in polyvinyl halides such as PVC and the like.

The modifiers of acrylic core/shell polymer and MBS may be used in PVC, chlorinated PVC, as well as other compositions where vinyl chloride or other vinyl halide as the major (greater than 50%) component monomer of the resin. These compositions include, but are not limited to: copolymers of vinyl chloride with other monomers that include vinyl alkanoates such as vinyl acetate and the like, vinylidene halides such as vinylidene chloride and the like, alkyl esters of unsaturated carboxylic acids such as ethyl acrylate, 2-ethylhexyl acrylate and the like, unsaturated hydrocarbons such as ethylene, propylene, isobutylene and the like, allyl compounds such as allyl acetate and the like.

Thermal stabilizers, lubricants and pigments may be also included in the polyvinyl halide as is known in the art. Typically, such stabilizers are based upon tin and barium as is known in the art. In addition, processing aids, fillers, and the like may be incorporated into the polyvinyl halide. Plasticizers may also be included to impart flexibility to the PVC composition. Examples of plasticizers which may be employed in PVC are dioctyl phthalate, poly (propylene adipate) and the like.

Acrylic core/shell polymers which have at least fifty percent $C_2$-$C_8$ Alkyl acrylate in the core may be combined with MBS polymers. Preferably, at least fifty percent of the core is butyl acrylate. Preferably, the core of the MBS polymer has at least about 75% butadiene. MBS polymers which have a core of butadiene copolymerized with styrene with optional crosslinkers such as di vinyl benzene, an intermediate shell of styrenic polymers such as styrene, styrene/methacrylate copolymers, and homopolymers or copolymers of alkyl acrylates and alkyl methacrylates, and an outer shell of homopolymers or copolymers of alkyl acrylates and alkyl methacrylates, styrenic polymers such as styrene, and styrene/methacrylate copolymers may be employed in the MBS polymer.

Modifiers of acrylic core/shell polymers and MBS copolymers may be produced by methods known in the art. For example, a mixture of the polymers may be formed by physical blending of the polymers by roll milling and dry mixing with a mechanical mixer. Alternatively, an emulsion of the polymers may be co-isolated by, for example, spray drying or coagulation.

The modifiers may include the acrylic core/shell polymers and MBS polymers components in any amounts sufficient to impart desirable properties such as improved pearlescence and impact strength. Preferably, modifiers which have 85-90% acrylic core/shell polymer are employed. Most preferably, modifiers which have about 87.5% acrylic core/shell polymer are employed.

The following, non-limiting examples illustrate the invention.

EXAMPLE 1

A. Preparation of the Modifier Composition

A modifier composition of a mixture of about 87.5% of an acrylic core/shell polymer having 80% of a core of butyl acrylate and 20% of a shell of methyl methacrylate was blended with about 12.5% of an MBS core/shell polymer having 75% of a core of about 90% butadiene, about 12% first outer stage of styrene, and about 12% second outer stage of methyl methacrylate to provide the desired modifer composition. (These acrylic core/shell, and MBS core/shell polymers are commercially available from Rohm and Hass Co.)

B. Preparation of Pigmented PVC

About 8% by weight of the modifier composition was added to 100 parts PVC resin having a K value of 50-58. Two parts tin stabilizer, 2.7 parts glycerol monostearate, and 0.3 parts polyethylene lubricant, and 2 parts carbon black were also included in the PVC resin. The resulting composition was mixed in a high intensity mixer at approximately 88° C. The mixing blades rotated at 2500-3000 rpm. When the temperature of the mixture reached 100° C., the mixing blade speed was reduced to 1200 rpm and the powder blend was cooled to 60° C. The resultant; pigmented PVC powder was relatively non-compacting and flowable.

C. Extrusion and Molding of the Modified, Pigmented PVC

The pigmented PVC formulation containing 8% of the modifier was extruded into pellets on a 1-inch Killion extruder containing a single-stage 2/1 compression ratio screw and a 2-strand pelletizing die. Extrusion temperature conditions were:

feed zone: 138° C.; vent and metering zones: 150° C.; die zone: 160° C. The pelletized PVC was then injection molded by a 30 ton Arburg press into 0.318 centimeter thick bars for Izod impact tests. The temperatures in the barrel of the press were: feed zone—170° C.; center zone—185° C.; metering zone—186° C. The temperature of the injection mold was 120° C.

EXAMPLE 2

The procedure of Example 1 was repeated with an acrylic core/shell polymer having a greater amount of butyl acrylate in the core. In this example, the acrylic core/shell polymer had a core of a core of about 83.5% butyl acrylate and about 16.5% of a shell of methyl methacrylate. This acrylic core/shell polymer was blended with 12.5% of an MBS core/shell polymer having at least about 80% of a core of about 75% butadiene copolymerized with about 25% styrene, about 10% of an intermediate stage of methyl methacrylate, and about 10% of an outer stage of styrene. (These acrylic core/shell, and MBS core/shell polymers are commercially available from Rohm and Haas Co.)

EXAMPLE 3

This example demonstrates the effects of modifiers which have only an acrylic core/shell polymer. Accordingly, the procedure of Example 1 was followed with the exception that an MBS polymer was not included in the modifier composition.

EXAMPLE 4

This example shows performance of PVC compositions which do not have modifiers of acrylic core/shell polymers with MBS core/shell polymers. Accordingly, the procedure of Example 1 was followed with the exception that no modifier was included in the PVC.

The results of the foregoing examples are shown in Table I.

TABLE I

| Example | Molded Part[a] Appearance (Pearlescence) | Hunter[b] L Value | ⅛ inch Notched[c] Izod at 23° C. Ft-lb/in |
|---|---|---|---|
| 1 | 2 | 8.4 | 12.9 |
| 2 | 1 | 8.3 | 3.7 |
| 3 | 5 | 10.2 | 2.2 |
| 4 | 1 | 6.7 | 0.6 |

[a]Pearlescence rating: 1 = none 2 = very slight 5 = Substantial
Ratings of pearlescence are made by visually comparing the relative amounts of withening of the samples.
[b]Hunter value ratings were made in accordance with ASTM Method No. 1925.
[c]Izod values were measured according to ASTM D256

Table I illustrates that modifiers of acrylic core/shell polymers with MBS provide PVC products which retain equivalent or greater color intensity than that that provided by acrylic core/shell polymer modifiers in PVC. PVC products which include modifiers of acrylic core/shell polymer and MBS also have significantly improved impact strength and reduced pearlescence.

While the invention has been described and exemplified in detail, various modifications, alternative embodiments, alterations and improvements should become apparent without departure from the spirit and scope of the invention.

We claim:

1. A polymer composition of an acrylate core/shell polymer and a butadiene core/shell polymer, comprising from about 50 to about 95 weight percent of a first acrylate core/shell polymer having an alkyl acrylate core and a shell of alkyl methacrylate, and from about 5 to about 50 weight percent of a second core/shell polymer having a core of a polymer containing butadiene, a first outer stage of a polymer selected from the group of styrenic polymers, styrenic/methacrylate polymers, and alkyl methacrylate polymers, and a second outer stage of a polymer selected from the group of styrenic polymers, styrenic/methacrylate polymers, and alkyl methacrylate polymers.

2. The composition of claim 1 wherein said alkyl acrylate core is selected from $C_2$–$C_8$ acrylates.

3. The composition of claim 1 wherein said polymer containing butadiene is selected from butadiene, and butadiene with styrene.

4. The composition of claim 1 wherein said styrenic polymer is selected from styrene homopolymers, and styrene copolymers.

5. The composition of claim 1 wherein said acrylate core/shell polymer is about 85 to 90 percent of said composition.

6. The composition of claim 5 wherein said acrylate core/shell polymer is about 87.5% of said composition.

7. The composition of claim 1 wherein said methyl methacrylate is about twelve percent of said second core/shell polymer.

8. The composition of claim 1 wherein said polymer containing butadiene is at least 75 percent butadiene.

9. The composition of claim 1 wherein said alkyl acrylate is butyl acrylate.

10. An improved polyvinyl halide composition of a polyvinyl halide and a polymer composition of an acrylate core/shell polymer and a butadiene core/shell polymer, comprising from about 50 to about 95 weight percent of a first acrylate core/shell polymer having an alkyl acrylate core and a shell of methyl methacrylate, and from about 5 to about 50 weight percent of a second core/shell polymer having a core of a polymer containing butadiene, a first outer stage of a polymer selected from the group of styrenic polymers, styrenic/methacrylate polymers, and alkyl methacrylate polymers, and a second outer stage of a polymer selected from the group of styrenic polymers, styrenic/methacrylate polymers, and alkyl methacrylate polymers, wherein said improved polyvinyl halide composition has a pearlescence rating equal or below 2, and a ⅛ inch Notched Izod value at 23° C. of about 3 ft.-lb./inch or greater.

11. The composition of claim 10 wherein said alkyl acrylate core is selected from $C_2-C_8$ acrylates.

12. The composition of claim 10 wherein said butadiene containing polymer is selected from butadiene, and butadiene with styrene.

13. The composition of claim 10 wherein said styrenic polymer is selected from styrene homopolymers and copolymers.

14. The composition of claim 10 wherein said acrylate core/shell polymer is about 85 to 90 percent of said polymer composition.

15. The composition of claim 10 wherein said methyl methacrylate is about 12 percent of said second core/shell polymer.

16. The composition of claim 10 wherein said acrylate core/shell polymer is about 87.5 percent of said polymer composition.

17. The composition of either claim 10 or 11 wherein said styrenic polymer is about 12 percent if said second core/shell polymer.

18. The polyvinyl halide composition of claim 10 wherein said polymer composition is at least about eight percent of said polyvinyl halide, and said polyvinylhalide is polyvinyl chloride.

19. The composition of claim 10 wherein the polyvinyl halide is selected from the group consisting of polyvinyl chloride, chlorinated polyvinyl chloride, and copolymers comprising greater than 50 weight percent of a vinyl halide polymer.

* * * * *

UNITED STATES PATENT AND TRADEMARK OFFICE
CERTIFICATE OF CORRECTION

PATENT NO. : 5,047,474
DATED : September 10, 1991
INVENTOR(S) : Ismail S. Rabinovic, et. al.

It is certified that error appears in the above-identified patent and that said Letters Patent is hereby corrected as shown below: On the Title page, Item [19] and [75], please change "Rabinovich" to read --Rabinovic--.

Column 6, line 11, delete "if" and substitute --of--.

Signed and Sealed this

Twenty-ninth Day of December, 1992

Attest:

DOUGLAS B. COMER

*Attesting Officer*  *Acting Commissioner of Patents and Trademarks*